United States Patent
Shea et al.

(10) Patent No.: US 9,789,967 B2
(45) Date of Patent: Oct. 17, 2017

(54) ENVIRONMENTAL CONTROL SYSTEM

(71) Applicant: Hamilton Sundstrand Corporation, Windsor Locks, CT (US)

(72) Inventors: Brian R. Shea, Windsor, CT (US); Thomas M. Zywiak, Southwick, MA (US); Laura Jean Coates, Windsor Locks, CT (US); Michael Francis Short, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/971,297

(22) Filed: Dec. 16, 2015

(65) Prior Publication Data

US 2017/0174348 A1    Jun. 22, 2017

(51) Int. Cl.
*G05D 21/00* (2006.01)
*B64D 13/00* (2006.01)
(Continued)

(52) U.S. Cl.
CPC ............ *B64D 13/08* (2013.01); *B64D 13/02* (2013.01); *B64D 2013/0618* (2013.01); *B64D 2013/0662* (2013.01); *B64D 2013/0666* (2013.01)

(58) Field of Classification Search
CPC .... B64D 2013/0648; B64D 2013/0644; B64D 2013/0651; B64D 2013/0677; B64D 2013/0607; B64D 2013/0688; B64D 2041/002; Y02T 50/56; Y02T 50/44; Y02T 50/545; Y02T 29/4962; Y02T 29/49826; Y02T 29/4935; G05B 23/0235; G05B 23/02
(Continued)

(56) References Cited

U.S. PATENT DOCUMENTS 5,461,882 A * 10/1995 Zywiak .............. B60H 1/00007
                                                    62/401
5,939,800 A *  8/1999 Artinian ................ B64D 13/06
                                                   244/53 R
(Continued)

FOREIGN PATENT DOCUMENTS

EP    1053176 A1    11/2000
EP    1884465 A2     2/2008
(Continued)

OTHER PUBLICATIONS

European Search Report for EP Application No. 16203966.3 dated Apr. 11, 2017.

*Primary Examiner* — Mohammad M Ali
(74) *Attorney, Agent, or Firm* — Cantor Colburn LLP

(57) ABSTRACT

A method of controlling an outlet temperature of a heat exchanger of an aircraft includes operating an air cycle machine at a first operating speed. The air cycle machine is operatively coupled to an air cycle machine bypass valve at a first position. The air cycle machine is fluidly connected to a first heat exchanger disposed adjacent to a second heat exchanger. In response to a second heat exchanger outlet temperature less than a second heat exchanger outlet temperature threshold while the aircraft is operating at an altitude less than an altitude threshold, the method moves the air cycle bypass valve from the first position toward a second position.

16 Claims, 2 Drawing Sheets

(51) Int. Cl.
*B64D 13/08* (2006.01)
*B64D 13/02* (2006.01)
*B64D 13/06* (2006.01)

(58) Field of Classification Search
USPC .......................................... 62/401, 402, 87
See application file for complete search history.

(56) References Cited

U.S. PATENT DOCUMENTS

| | | | |
|---|---|---|---|
| 6,058,715 | A | 5/2000 | Strang et al. |
| 6,250,097 | B1 * | 6/2001 | Lui ..................... B64D 13/06 62/402 |
| 6,427,471 | B1 | 8/2002 | Ando et al. |
| 7,845,188 | B2 | 12/2010 | Brutscher et al. |
| 2003/0177780 | A1 | 9/2003 | Brutscher et al. |
| 2006/0162371 | A1 | 7/2006 | Lui et al. |
| 2008/0032616 | A1 * | 2/2008 | Vogel ................... B64D 13/06 454/74 |
| 2010/0310392 | A1 * | 12/2010 | Lippold ................ B64D 13/00 417/405 |
| 2010/0313591 | A1 | 12/2010 | Lents et al. |
| 2013/0152615 | A1 * | 6/2013 | Lee ...................... H05K 7/207 62/241 |
| 2014/0008035 | A1 | 1/2014 | Patankar et al. |
| 2014/0305130 | A1 | 10/2014 | Shepard et al. |
| 2015/0059397 | A1 | 3/2015 | Bruno et al. |

FOREIGN PATENT DOCUMENTS

| | | |
|---|---|---|
| EP | 2808256 A1 | 12/2014 |
| EP | 2848534 A1 | 3/2015 |
| EP | 2942277 A1 | 11/2015 |

* cited by examiner

ENVIRONMENTAL CONTROL SYSTEM

BACKGROUND OF THE INVENTION

The present invention relates to an environmental control system, more specifically the control of an outlet temperature of a heat exchanger of the environmental control system.

Aircraft are provided with an environmental control system. The environmental control system may include ram air cooled heat exchangers and an air conditioning pack to supply conditioned air to the aircraft cabin. Operation of the aircraft on colder days may result in the formation of ice within a component of the environmental control system. The formation of ice within a component of the environmental control system may present an imbalance within the environmental control system.

SUMMARY OF THE INVENTION

In an embodiment of the present invention, an aircraft is provided. The aircraft includes a ram air duct having an inlet door and an environmental control system. The environmental control system has first and second heat exchangers disposed within the ram air duct, an air cycle machine, a temperature sensor, an air cycle machine bypass valve, and a controller. The air cycle machine includes a compressor fluidly connected to the first heat exchanger and the second heat exchanger. The temperature sensor is fluidly connected to the second heat exchanger and the air cycle machine. The air cycle machine bypass valve is fluidly connected to the first heat exchanger and the air cycle machine. The controller is programmed to; while the air cycle machine is operating at a first operating speed and the air cycle machine bypass valve is in a first position, in response to a second heat exchanger outlet temperature being less than a second heat exchanger threshold, increase the air cycle machine speed to a second operating speed greater than the first operating speed.

In another embodiment of the present invention, an environmental control system for an aircraft is provided. The environmental control system includes an air cycle machine, a temperature sensor, an air cycle machine bypass valve, and a controller. The air cycle machine includes a compressor fluidly connected to a first heat exchanger and a second heat exchanger. The temperature sensor is disposed proximate an outlet of the second heat exchanger. The air cycle machine bypass valve is fluidly connected to a first heat exchanger outlet, a compressor inlet, and an environmental control system outlet. The controller is in communication with the temperature sensor and the air cycle machine bypass valve. The controller is programmed to move the air cycle machine bypass valve from the first position toward a second position, while the air cycle machine is operating at a first operating speed and the air cycle machine bypass valve is in a first position, in response to a second heat exchanger temperature being less than a second heat exchanger outlet temperature threshold.

In yet another embodiment of the present invention, a method of controlling an outlet temperature of a heat exchanger of an aircraft is provided. The method includes operating an air cycle machine at a first operating speed. The air cycle machine is operatively coupled to an air cycle machine bypass valve at a first position. The air cycle machine is fluidly connected to a first heat exchanger disposed adjacent to a second heat exchanger. The method moves the air cycle machine bypass valve from the first position toward a second position, while the aircraft is operating at an altitude less than an altitude threshold, in response to a second heat exchanger outlet temperature being less than a second heat exchanger outlet temperature threshold.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
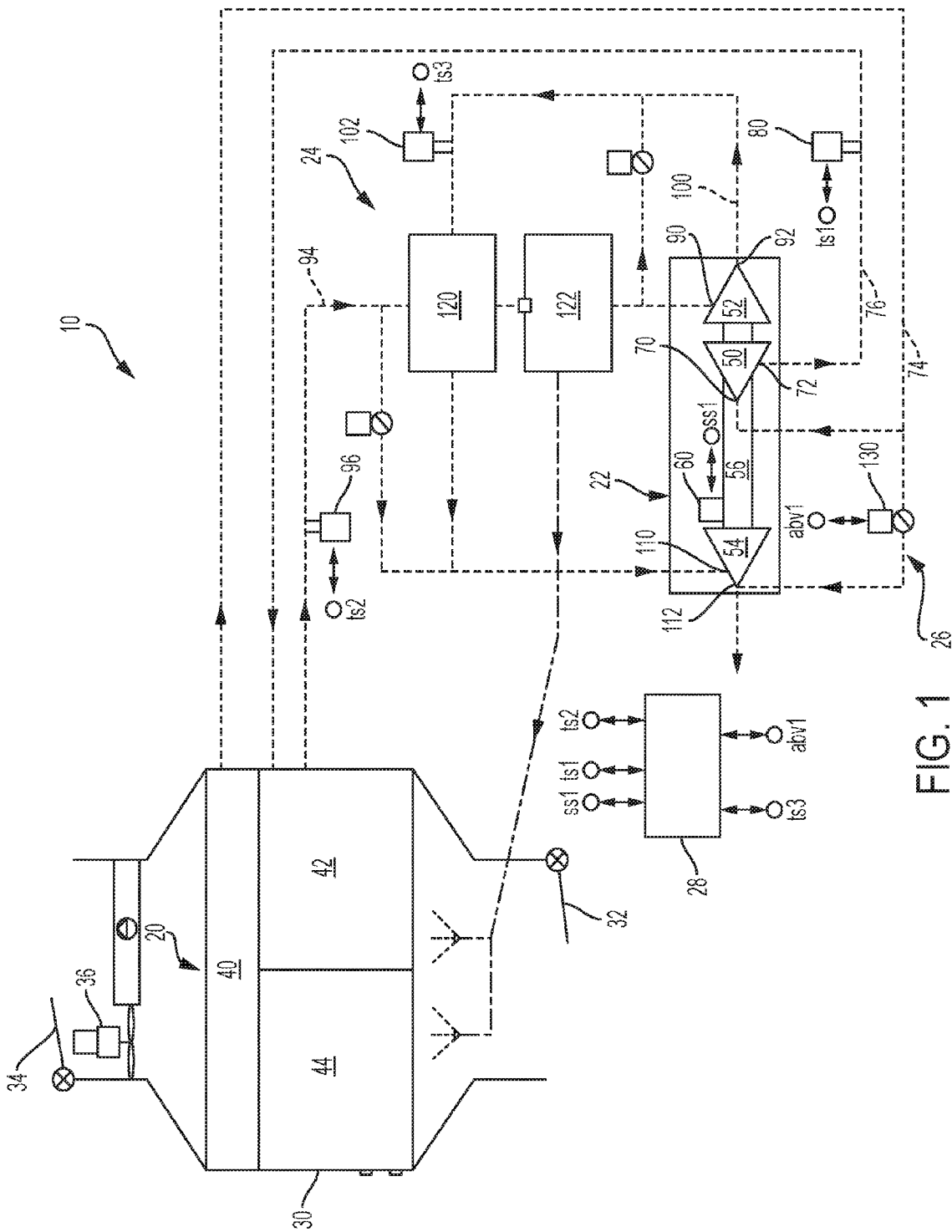
FIG. 1 is a schematic diagram of an environmental control system of an aircraft.

Referring to FIG. 1, a schematic diagram of an environmental control system 10 of an aircraft is illustrated schematically. The environmental control system 10 is configured to receive bleed air from an engine such as a gas turbine engine of the aircraft. In at least one embodiment, the environmental control system 10 is configured to receive bleed air supplied from a cabin air compressor or supercharger that may be powered independently from the gas turbine engine. The environmental control system 10 includes a heat exchanger pack 20, an air cycle machine 22, a humidity control system 24, a valve system 26, and a controller 28.

The heat exchanger pack 20 is disposed within a ram air duct 30. The heat exchanger pack 20 is disposed between an inlet portion of the ram air duct 30 and an outlet portion of the ram air duct 30. The heat exchanger pack 20 receives ram air directed through the inlet portion of the ram air duct 30. The heat exchanger pack 20 exhausts air through the outlet portion of the ram air duct 30.

The inlet portion of the ram air duct 30 includes a ram air inlet door 32. The position of the ram air inlet door 32 may be varied by an actuator to vary the inlet area of the ram air duct 30.

The outlet portion of the ram air duct 30 includes a ram air exit door 34. The position of the ram air exit door 34 may be varied by an actuator to vary the outlet area of the ram air duct 30.

The ram air inlet door 32 and the ram air exit door 34 each have a range of authority or range of positions that enable the ram air inlet door 32 and the ram air exit door 34 to regulate air flow through the heat exchanger pack 20. In at least one embodiment, a ram air fan 36 is provided. The ram air fan 36 assists in moving air through the heat exchanger pack 20 and the ram air duct 30.

The heat exchanger pack 20 includes a first heat exchanger 40, a second heat exchanger 42, and a third heat exchanger 44. The first heat exchanger 40 is referred to as a primary heat exchanger. The second heat exchanger 42 is referred to as a secondary heat exchanger. The third heat exchanger 44 is referred to as a PECS liquid to air heat exchanger.

The first heat exchanger 40 is positioned downstream of the second heat exchanger 42 and the third heat exchanger 44. The first heat exchanger 40 is positioned within the ram air duct 30 such that the ram air flowing through the inlet portion of the ram air duct 30 enters at least one of the second heat exchanger 42 and the third heat exchanger 44 before passing through the first heat exchanger 40. The first heat exchanger 40 is positioned within the ram air duct 30 closer to the outlet portion of the ram air duct 30 than the second heat exchanger 42 and the third heat exchanger 44. The first heat exchanger 40 is configured to provide bleed air to the air cycle machine 22.

The second heat exchanger 42 is positioned upstream of the first heat exchanger 40. The second heat exchanger 42 is disposed adjacent to the third heat exchanger 44. The second heat exchanger 42 and the third heat exchanger 44 are positioned within the ram air duct 30 closer to the inlet portion of the ram air duct 30 than the first heat exchanger 40. The second heat exchanger 42 is configured to receive compressed bleed air from the air cycle machine 22 (e.g., via conduit 76) and is configured to provide the compressed bleed air to the humidity control system 24 (e.g., via conduit 94).

In one embodiment, the air cycle machine 22 is spaced apart from the heat exchanger pack 20 and the ram air duct 30. The air cycle machine 22 includes a compressor 50, a first turbine 52, and a second turbine 54 disposed on a spool 56. The compressor 50 is disposed on an air bearing disposed on the spool 56. The first turbine 52 is disposed on another air bearing disposed on the spool 56. The first turbine 52 is connected to a first side of the compressor 50. The second turbine 54 is connected to a second side of the compressor 50. The second turbine 54 is disposed on yet another air bearing disposed on the spool 56.

The air bearings are configured as foil bearings that generate an air film capable of sustaining operating modes of the air cycle machine 22. The air cycle machine 22 is controlled to operate at a minimum speed to ensure that a full or sufficient air film is generated by the air bearings.

The air cycle machine 22 includes a speed sensor 60 that is configured to provide a signal indicative of a rotational speed of the air cycle machine 22 to the controller 28. The communication between the speed sensor 60 and the controller 28 is represented by a connection node, ss1, in FIG. 1. The speed sensor 60 is disposed proximate a component of the air cycle machine 22. In at least one embodiment, the speed sensor 60 is disposed proximate the spool 56.

The compressor 50 includes a compressor inlet 70 and a compressor outlet 72. The compressor inlet 70 is fluidly connected to a first heat exchanger outlet through a first conduit 74. The first conduit 74 fluidly connects the first heat exchanger outlet to the compressor inlet 70 and to an environmental control system outlet that provides conditioned air to the aircraft cabin.

The compressor outlet 72 is fluidly connected an inlet of the second heat exchanger 42 through a second conduit 76. A first temperature sensor 80 is disposed within or included with the second conduit 76. The first temperature sensor 80 is configured to provide a signal indicative of a temperature of the compressed bleed air provided by the compressor outlet 72 to the second heat exchanger inlet to the controller 28. The communication between the first temperature sensor 80 and the controller 28 is represented by a connection node, ts1, in FIG. 1.

The first turbine 52 includes a first turbine inlet 90 and a first turbine outlet 92. The first turbine inlet 90 is fluidly connected to a second heat exchanger outlet through the humidity control system 24 via a third conduit 94. A second temperature sensor 96 is disposed within or included with the third conduit 94. The second temperature sensor 96 is configured to provide a signal indicative of a temperature of the discharged bleed air provided by the second heat exchanger outlet to the controller 28. The communication between the second temperature sensor 96 and the controller 28 is represented by a connection node, ts2, in FIG. 1.

The first turbine outlet 92 is fluidly connected to the humidity control system 24 and the second turbine 54 through a fourth conduit 100. A third temperature sensor 102 is disposed within or included with the fourth conduit 100. The third temperature sensor 102 is configured to provide a signal indicative of a temperature of the bleed air discharged by the first turbine outlet 92 to the controller 28. The communication between the third temperature sensor 102 and the controller 28 is represented by a connection node, ts3, in FIG. 1.

The second turbine 54 includes a second turbine inlet 110 and a second turbine outlet 112. The second turbine inlet 110 is fluidly connected to an outlet of the humidity control system 24 by the fourth conduit 100. The second turbine outlet 112 is fluidly connected to the environmental control system outlet via the first conduit 74.

The humidity control system 24 interfaces with the heat exchanger pack 20 and the air cycle machine 22. The humidity control system 24 is configured to remove moisture from the bleed air discharged from the second heat exchanger 42 and/or bleed air discharged by the first turbine outlet 92. The humidity control system 24 includes a condenser 120 and a water extractor 122.

The condenser 120 includes a first condenser inlet that receives bleed air from the second heat exchanger outlet via the third conduit 94. The condenser 120 includes a first condenser outlet that provides bleed air to a first water extractor inlet of the water extractor 122. The water extractor 122 includes a first water extractor outlet that provides bleed air from the condenser 120 to the first turbine inlet 90.

The condenser 120 includes a second condenser inlet that receives bleed air discharged from the first turbine outlet 92 via the fourth conduit 100. The condenser 120 includes a second condenser outlet that provides bleed air to the second turbine inlet 110.

The valve system 26 includes an air cycle machine bypass valve 130. The air cycle machine bypass valve 130 is disposed within the first conduit 74. The air cycle machine bypass valve 130 is configured to selectively regulate bleed air flow through the air cycle machine 22. More specifically, the air cycle machine bypass valve 130 is configured to selectively regulate the amount of bleed air discharged from the first heat exchanger outlet that bypasses the air cycle machine 22 and exits through the environmental control system outlet.

The position of the air cycle machine bypass valve 130 is selectively controlled by the controller 28. The controller 28 is configured to receive a signal indicative of a position of the air cycle machine bypass valve 130. The controller 28 is configured to provide a signal to the air cycle machine bypass valve 130 to vary the position of the air cycle machine bypass valve 130. The communication between the air cycle machine bypass valve 130 and the controller 28 is represented by a connection node, abv1, in FIG. 1.

The air cycle machine bypass valve 130 is configured to move between a plurality of positions. As a position of the air cycle machine bypass valve 130 is varied, the amount of bleed air flow provided to the air cycle machine 22 is varied such that a speed of the air cycle machine 22 varies. The air cycle machine bypass valve 130 is configured to move between a first position and a second position.

The first position of the air cycle machine bypass valve 130 corresponds to an open position of the air cycle machine bypass valve 130 that permits bleed air to bypass the air cycle machine 22 and exit via the first conduit 74 through the environmental control system outlet. As more air bypasses the air cycle machine 22 the speed of the air cycle machine 22 decreases.

The second position of the air cycle machine bypass valve 130 corresponds to a closed position of the air cycle machine bypass valve 130. In the closed position the air cycle machine bypass valve 130 inhibits bleed air from bypassing the air cycle machine 22. As more bleed air is directed toward the air cycle machine 22 the speed of the air cycle machine 22 increases.

While illustrated as one controller, the controller 28 may be part of a larger control system and may be controlled by various other controllers throughout the aircraft. It should therefore be understood that the controller 28 and one or more other controllers may collectively be referred to as a "controller" that controls various actuators or valves in response to signals from various sensors to control functions such as operating the air cycle machine 22, regulating valve positions, controlling actuation of at least one of the ram air inlet door 32 and the ram air exit door 34.

The controller 28 includes a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the environmental control system or the aircraft.

The controller communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 28 may communicate signals to and/or from environmental control system components.

Control logic or functions performed by the controller 28 or at least one processor may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 28 is provided with a control strategy to mitigate the potential of ice forming within the environmental control system 10. The control strategy attempts to inhibit the formation of ice on a component of the air cycle machine 22, such as the compressor 50, the first turbine 52, and the second turbine 54. As the aircraft is operated at an altitude less than 30,000 feet, there may be sufficient humidity in the air to permit ice formation due to ambient temperatures at the operating altitude.

During cold day operation at altitudes less than 30,000 feet, less ram air is permitted to enter into the heat exchanger pack 20 of the environmental control system 10. Despite the reduction in ram air provided to the environmental control system 10, the cold ambient temperatures may be sufficient to cause the speed of the air cycle machine to decrease. This reduction in air cycle machine 22 speed reduces the ability of the air bearings to sustain the operating modes of the air cycle machine 22. Additionally, the outlet temperature of the second heat exchanger 42 may decrease below a second heat exchanger outlet temperature threshold due to the decreased air cycle machine 22 speed. Should the second heat exchanger outlet temperature fall below the second heat exchanger outlet temperature threshold there is potential for ice formation within a component of the environmental control system 10. For example, the second heat exchanger outlet temperature threshold is 45° F.

The controller 28 is configured to modulate the position of the air cycle machine bypass valve 130. The modulation of the air cycle machine bypass valve 130 affects the heat exchanger pack 20 outlet temperature, the second heat exchanger 42 outlet temperature, and the air cycle machine 22 speed. As the controller 28 commands the air cycle machine bypass valve 130 to move from an open position (first position) toward a closed position (second position) more bleed air is forced through the air cycle machine 22 and the speed of the air cycle machine 22 increases and the second heat exchanger outlet temperature increases.

The controller 28 is provided with a restriction or limiter that inhibits the controller 28 from completely closing the air cycle machine bypass valve 130. The restriction requires the controller 28 to continuously monitor the position of the air cycle machine bypass valve 130 and the air cycle machine 22 speed via the speed sensor 60. In response to the air cycle machine 22 achieving a minimum operating speed that results in rigid body operation the controller 28 inhibits the air cycle machine bypass valve 130 from rotating further toward the closed position.

The minimum air cycle machine operating speed is based the air bearing requirements and the air cycle machine rigid body modes. The minimum air cycle machine operating speed ensures the air bearings have generated a substantially full air film capable of sustaining operating modes of the air cycle machine 22. The minimum air cycle machine operating speed also ensures that the air cycle machine speed is greater than the speed at which the air cycle machine rigid body modes occur. The air cycle machine rigid body modes enable the air cycle machine 22 to operate with minimal disturbances if ice forms on a blade of at least one of the compressor 50, the first turbine 52, and the second turbine 54. The air cycle machine rigid body modes enables the air cycle machine components to be more robust against ice formation and potential unbalance of the air cycle machine components due to ice formation while operating at turbine inlet temperatures approaching a freezing point.

Certain enablement basics are satisfied prior to the controller 28 implementing the control strategy to mitigate the potential of ice forming within the environmental control system 10. The enablement basics include at least one of or a combination of the following: an aircraft operating at an altitude less than 30,000 feet, a ram air inlet temperature approaching a freezing temperature, a second heat exchanger outlet temperature less than a second heat exchanger outlet temperature threshold, a first turbine inlet temperature less than a first turbine inlet temperature threshold, the ram air inlet door 32 and the ram air exit door 34 at a fixed position for the given operation of the aircraft, at least one of the ram air inlet door 32 and the ram air exit door 34 being operated by the controller 28 at full authority.

Figure 2:
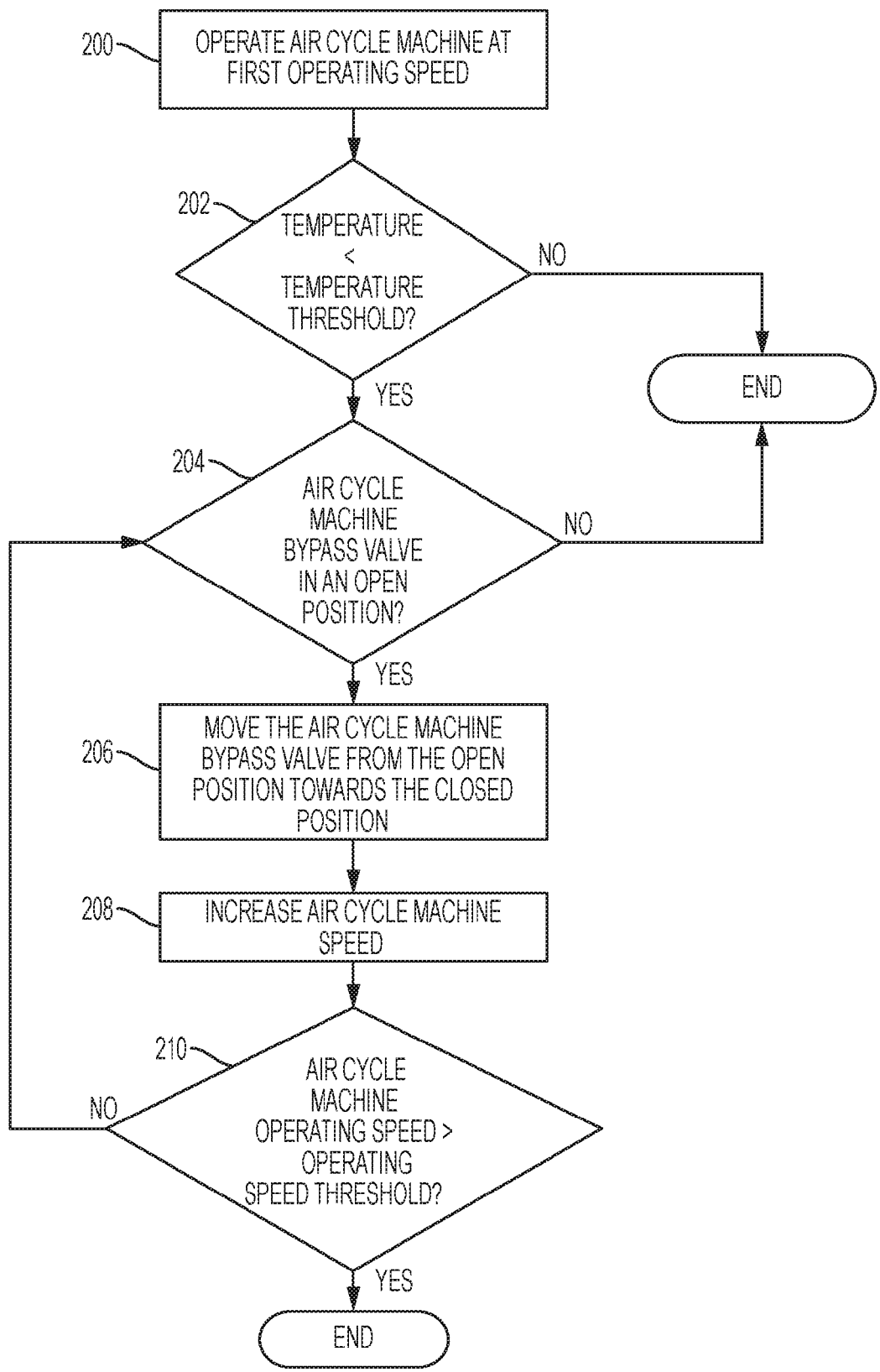
FIG. 2 is a flow chart of a method of controlling an outlet temperature of a heat exchanger of an environmental control system of an aircraft.

Referring to FIG. 2, a flowchart of an illustrative method of controlling an outlet temperature of a heat exchanger of an environmental control system of an aircraft is shown. The method may be executed by the controller 28 and may be implemented as a closed loop control system. For brevity, the method will be described in the context of a single method iteration.

At block 200, the method operates the air cycle machine 22 at a first operating speed while maintaining the air cycle machine bypass valve 130 in a first position. At block 202, the method assesses a temperature and compares it to a temperature threshold. The temperature is a second heat exchanger outlet temperature or first turbine inlet temperature provided by the second temperature sensor 96. In at least one embodiment, the temperature is a ram air inlet temperature measured by a temperature sensor disposed proximate the inlet portion of the ram air duct 30. The temperature threshold is indicative of a temperature in which ice may form on a component of the environmental control system 10. If the temperature is greater than the temperature threshold, the method ends. Should the temperature be less than the temperature threshold the method continues to block 204.

At block 204, the method assesses the position of the air cycle machine bypass valve 130. The method determines if the air cycle machine bypass valve 130 is in an open position or a closed position. If the air cycle machine bypass valve 130 is in a closed position, the method may end. Should the air cycle machine bypass valve 130 be in an open position, the method continues to block 206.

At block 206, the method moves the air cycle machine bypass valve 130 from the first position toward a second position. The method moves the air cycle machine bypass valve 130 toward a closed position while not completely closing the air cycle machine bypass valve 130.

At block 208, in response to the air cycle machine bypass valve 130 moving from the first position toward the second position, the operating speed of the air cycle machine 22 increases. The air cycle machine speed increases to a second operating speed greater than the first operating speed. The operating speed of the air cycle machine 22 increases due to the increased bleed air provided to the air cycle machine as a result of a reduction in air permitted to bypass the air cycle machine 22 by the air cycle machine bypass valve 130 moving toward the closed position. The increase in operating speed of the air cycle machine 22 to the second operating speed increases the second heat exchanger outlet temperature.

At block 210, the method assesses the operating speed of the air cycle machine 22 and compares it to an operating speed threshold. The operating speed of the air cycle machine 22 is provided by the speed sensor 60. The operating speed threshold is indicative of an operating speed of the air cycle machine 22 that ensures sufficient air film on the air bearings to sustain the operating modes of the air cycle machine 22 and/or is ensures that the rotational speed of the air cycle machine 22 is greater than a rotational speed at which the air cycle machine 22 rigid body modes occur. If the operating speed of the air cycle machine 22 is greater than the operating speed threshold, the method ends. Should the operating speed of the air cycle machine 22 be less than the operating speed threshold, the method returns to block 204. Upon return to block 204, the method assesses whether the air cycle machine bypass valve 130 may be further moved toward the closed position to further increase the operating speed of the air cycle machine 22 to ultimately satisfy the operating speed threshold.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An aircraft comprising:
a ram air duct having an inlet door; and
an environmental control system including:
   a first heat exchanger and a second heat exchanger disposed within the ram air duct;
   an air cycle machine that includes a compressor fluidly connected to the first heat exchanger and the second heat exchanger;
   a temperature sensor fluidly connected to the second heat exchanger and the air cycle machine;
   an air cycle machine bypass valve fluidly connected to the first heat exchanger and the air cycle machine; and
   a controller programmed to, while the inlet door is at full authority, the air cycle machine is operating at a first operating speed, and the air cycle machine bypass valve is in a first position, in response to a second heat exchanger outlet temperature being less than a second heat exchanger outlet temperature threshold, increase the air cycle machine speed to a second operating speed greater than the first operating speed.

2. The aircraft of claim 1, wherein in response to the air cycle machine bypass valve moving from the first position toward a second position, the air cycle machine speed increases.

3. The aircraft of claim 1, wherein in response to an increase of the air cycle machine speed from the first operating speed to the second operating speed, the second heat exchanger outlet temperature increases.

4. The aircraft of claim 1, further comprising a humidity control system fluidly connected to the second heat exchanger and the air cycle machine.

5. The aircraft of claim 4, wherein the air cycle machine further includes a first turbine connected to a first side of the compressor and a second turbine connected to a second side of the compressor.

6. An environmental control system for an aircraft, comprising:
    an air cycle machine that includes a compressor fluidly connected to a first heat exchanger and a second heat exchanger;
    a temperature sensor disposed proximate an outlet of the second heat exchanger;
    an air cycle machine bypass valve fluidly connected to a first heat exchanger outlet, a compressor inlet, and an environmental control system outlet; and
    a controller in communication with the temperature sensor and the air cycle machine bypass valve, the controller programmed to, in response to a second heat exchanger outlet temperature being less than a second heat exchanger outlet temperature threshold, while the air cycle machine is operating at a first operating speed and the air cycle machine bypass valve is in a first position, move the air cycle machine bypass valve from the first position toward a second position.

7. The environmental control system of claim 6, wherein the first position is an open position and the second position is a closed position.

8. The environmental control system of claim 6, wherein the controller is further programmed to, in response to the air cycle machine bypass valve moving from the first position to the second position, increase the air cycle machine speed from the first operating speed to a second operating speed greater than the first operating speed.

9. The environmental control system of claim 8, wherein the air cycle machine further includes a first turbine and a second turbine.

10. The environmental control system of claim 9, wherein the first turbine is fluidly connected to the second heat exchanger and the second turbine.

11. The environmental control system of claim 10, wherein the air cycle machine bypass valve is fluidly connected to the second turbine.

12. A method of controlling an outlet temperature of a heat exchanger of an environmental control system of an aircraft, the method comprising:
    operating an air cycle machine at a first operating speed, the air cycle machine operatively coupled to an air cycle machine bypass valve at a first position and the air cycle machine fluidly connected to a first heat exchanger disposed proximate a second heat exchanger; and
    in response to a second heat exchanger outlet temperature less than a second heat exchanger outlet temperature threshold while the aircraft is operating at an altitude less than an altitude threshold, moving the air cycle machine bypass valve from the first position toward a second position.

13. The method of claim 12, wherein the first position is an open position of the air cycle machine bypass valve and the second position is a closed position of the air cycle machine bypass valve.

14. The method of claim 13, further comprising in response to the moving the air cycle machine bypass valve from the first position toward the second position, operating the air cycle machine at a second operating speed greater than the first operating speed.

15. The method of claim 14, wherein a compressor of the air cycle machine is fluidly connected to the first heat exchanger and the second heat exchanger.

16. The method of claim 15, wherein increase in operating speed of the air cycle machine to the second operating speed increases the second heat exchanger outlet temperature.

* * * * *